(12) United States Patent
Takami et al.

(10) Patent No.: US 11,468,687 B2
(45) Date of Patent: Oct. 11, 2022

(54) TRAINING AND OPERATING A MACHINE LEARNING SYSTEM

(71) Applicant: Robert Bosch GmbH, Stuttgart (DE)

(72) Inventors: Masato Takami, Hildesheim (DE); Uwe Brosch, Hohenhameln (DE)

(73) Assignee: Robert Bosch GmbH, Stuttgart (DE)

( * ) Notice: Subject to any disclaimer, the term of this patent is extended or adjusted under 35 U.S.C. 154(b) by 363 days.

(21) Appl. No.: 16/762,757

(22) PCT Filed: Oct. 16, 2018

(86) PCT No.: PCT/EP2018/078177
§ 371 (c)(1),
(2) Date: May 8, 2020

(87) PCT Pub. No.: WO2019/110177
PCT Pub. Date: Jun. 13, 2019

(65) Prior Publication Data
US 2021/0182577 A1    Jun. 17, 2021

(30) Foreign Application Priority Data

Dec. 4, 2017 (DE) ...................... 10 2017 221 765.0

(51) Int. Cl.
*G06K 9/00* (2022.01)
*G06V 20/58* (2022.01)
(Continued)

(52) U.S. Cl.
CPC ......... *G06V 20/58* (2022.01); *B60W 60/0011* (2020.02); *G06K 9/6256* (2013.01);
(Continued)

(58) Field of Classification Search
CPC ... G06V 20/58; G06V 20/64; B60W 60/0011; G06K 9/6256; G06K 9/6293; G06N 3/04;
(Continued)

(56) References Cited

U.S. PATENT DOCUMENTS

| 10,664,953 | B1* | 5/2020 | Lanman | G06T 5/002 |
| 10,832,432 | B2* | 11/2020 | Anisimovskiy | G06T 7/80 |
| 2020/0294201 | A1* | 9/2020 | Planche | G06F 30/27 |

FOREIGN PATENT DOCUMENTS

DE    102008001256 A1    10/2009

OTHER PUBLICATIONS

Jung, et al.: "Depth Prediction From a Single Image With Conditional Adversarial Networks", 2017 IEEE International Conference on Image Processing (ICIP), pp. 1717-1721; 10.1109/ICIP.2017.8296575.

(Continued)

*Primary Examiner* — Dhaval V Patel
(74) *Attorney, Agent, or Firm* — Norton Rose Fulbright US LLP; Gerard Messina

(57) ABSTRACT

A method for training a machine learning system, in which image data are fed into a machine learning system with processing of at least a part of the image data by the machine learning system. The method includes synthetic generation of at least a part of at least one depth map that includes a plurality of depth information values. The at least one depth map is fed into the machine learning system with processing of at least a part of the depth information values of the at least one depth map. The machine learning system is then trained based on the processed image data and based on the processed depth information values of the at least one depth map, with adaptation of a parameter value of at least one parameter of the machine learning system, the adapted parameter value influencing an interpretation of input data by the machine learning system.

15 Claims, 2 Drawing Sheets

(51) Int. Cl.
  *G06T 7/50*      (2017.01)
  *G06N 20/00*     (2019.01)
  *B60W 60/00*     (2020.01)
  *G06K 9/62*      (2022.01)
  *G06N 3/04*      (2006.01)
(52) U.S. Cl.
  CPC .............. *G06N 3/04* (2013.01); *G06N 20/00* (2019.01); *G06T 7/50* (2017.01); *G06T 2207/10028* (2013.01); *G06T 2207/30261* (2013.01)
(58) Field of Classification Search
  CPC . G06N 20/00; G06T 7/50; G06T 2207/10028; G06T 2207/30261
  See application file for complete search history.

(56) References Cited

OTHER PUBLICATIONS

Liu and Tuzel: "Coupled Generative Adversarial Networks", 30th Conf. in Neural Information Processing Systems (NIPS 2016), Barcelona, Spaid, Advances in neural information processing systems, 29 (2016), pp. 1-9 (online: https://proceedings.neurips.cc/paper/2016/file/ 502e4a1 6930e414107ee22b6198c578fPaper.pdf.).
International Search Report for PCT/EP2018/078177, dated Jan. 16, 2019.
Carlucci Fabio Maria et al., "A Deep Representation for Depth Images From Synthetic Data", 2017 IEEE International Conference on Robotics and Automation (ICRA), IEEE, 2017, pp. 1362-1369. XP033126904.
Xia Yingjie et al., "Integrating 3D Structure Into Traffic Scene Understanding With RGB-D Data", Neurocomputing, Elsevier, Amsterdam , NL, vol. 151, 2014, pp. 700-709. XP029105369.
Eitel Andreas et al., "Multimodal Deep Learning for Robust RGB-D Object Recognition", 2015 IEEE/RSJ International Conference on Intelligent Robots and Systems (IROS ), IEEE, 2015, pp. 681-687. XP032831667.
Saleh Khaled et al., "Cyclist Detection in Lidar Scans Using Faster R-CNN and Synthetic Depth Images", 2017 IEEE 20th International Conference on Intelligent Transportation Systems (ITSC), IEEE, 2017, pp. 1-6. XP033330272.

* cited by examiner

TRAINING AND OPERATING A MACHINE LEARNING SYSTEM

FIELD

The present invention relates in general to the area of artificial intelligence. In particular, the present invention relates to a method for training a machine learning system, to a method for operating a machine learning system, and to a machine learning system.

BACKGROUND INFORMATION

Driving a motor vehicle in roadway traffic regularly requires reliable visual recognition of a large number of objects, such as other traffic participants, traffic signs, roadway boundaries, or obstacles of any kind. Increasingly, motor vehicles are being further developed in the direction of partly or completely automated driving, in which the recognition of objects, previously done by a driver, is artificially emulated. Due to the high degree of complexity of recognition processes, as a rule machine learning systems and/or artificial intelligence systems are used here, which carry out a classification of the objects that are recognizable in the image data, for example on the basis of image data recorded by a camera of the motor vehicle, in order ultimately to be able to automatically identify the objects. Such machine learning systems for recognizing objects can include for example a neural network.

Object recognition using machine learning systems can be further improved by evaluating data from other sensors, in addition to image data. Such systems are also referred to as multipath systems. Such a system can acquire and interpret the surrounding environment for example on the basis of visual information from various sources. Here, a learning system, such as a neural network that acquires the surrounding environment on the basis of image information from a single camera, can be supplemented by a module that acquires and interprets 3D information and/or temporal movement information. In this way, the object recognition as a whole can be improved.

However, in order to enable reliable recognition of objects in input data and/or sensor data using machine learning systems and/or artificial intelligence systems, these systems must be trained with a large quantity of training data. This can be a challenge, in particular in multipath systems.

SUMMARY

Using specific example embodiments of the present invention, a machine learning system can advantageously be comprehensively trained so that overall the machine learning system, and/or an object recognition based on the machine learning system, can be improved.

According to a first aspect of the present invention, an example method is provided for training a machine learning system. In a step of the method, image data are fed into a machine learning system with processing of at least a part of the image data. The method includes the following steps:

- synthetic generation and/or artificial production at least a part of at least one depth map that has a plurality of depth information values, each of the depth information values correlating with a distance to an object;
- feeding the at least one depth map into the machine learning system, with processing of at least a part of the depth information values of the at least one depth map by the machine learning system; and
- training the machine learning system based on the processed image data and based on the processed depth information values of the at least one depth map, with adaptation, varying, and/or modification of at least one parameter value of at least one parameter of the machine learning system, the adapted at least one parameter value influencing an interpretation of input data by the machine learning system and/or an output of the machine learning system.

In general, the machine learning system, hereinafter also designated "ML system" or simply "system," can designate any realization of an artificial intelligence system. In particular, the ML system can be designed as a classifier, for example as a neural network. The ML system can be configured as a multipath system and can be configured to process, analyze, and/or interpret depth maps as well, in addition to image data. For this purpose, the ML system can be realized as a one-part system, or can for example include a plurality of modules each of which can process different data. For example, the ML system can include a first module for processing image data and a second module for processing depth maps.

Here and in the following, the term "feeding in" of data to the ML system can designate a providing of data to the ML system, for example via a suitable data connection and/or a suitable interface of the ML system.

In addition, "training of the ML system" can designate a feeding in and processing of the corresponding data, such as the image data and/or the depth information values, to any data processing device of the ML system. In particular, the data for training the ML system can be propagated through the ML system in the forward direction, in a forward propagation, and/or in the backward direction, in a backward propagation. Here, the parameter value of the at least one parameter of the ML system can be adapted, modified, and/or varied iteratively and/or successively in such a way that a reaction to, and/or the interpretation of, any further input data is improved and/or optimized with respect to an intended use of the ML system. If, for example, the ML system is used for object recognition, then, using the method, the parameter value of the at least one parameter can be adapted, modified, and/or varied in such a way that ultimately the precision of the object recognition is improved. In this context, the "interpretation of the input data by the ML system" can mean that the system processes the input data and provides an output that is at least partly influenced in particular by the parameter value of the at least one parameter. If the ML system is for example a classifier, then the system can for example output at least one class designation, a class, and/or at least one probability value for a class of objects. Thus, in general the parameter can designate a variable, in particular a mathematical variable, based on which the ML system analyzes or interprets the input data supplied to it, such as sensor data, image data, and/or depth maps.

The image data named above and/or the at least one depth map can designate in particular training data of the ML system. For training purposes, the image data and/or the depth map can also be labeled. In other words, the image data and/or the depth map can also contain an item of information relating for example to the objects in the image data and/or in the depth map. Based on the labels of the image data and/or of the depth map, the ML system can in addition ascertain a recognition error, for training purposes, and the at least one parameter value of the at least one parameter can be adapted with minimization of the recognition error, in order to train the ML system and/or to optimize the object recognition.

The depth map can for example designate a disparity map that can represent data of an arbitrary sensor for the acquisition of distance information. The depth map can, as it were, represent, contain, and/or include items of information relating to a distance to an object, i.e., distance information. The depth map can also contain spatial information, three-dimensional information, and/or 3D information. The depth information values of the depth map can here designate distance data.

The input data can designate any sensor data, such as image data of a camera and/or a depth map of a distance sensor, that are evaluated, analyzed, and/or interpreted by the ML system, for example for object recognition. In particular, the input data can be unlabeled, and/or can designate data that are supplied to the ML system after the training of the ML system for the actual object recognition.

The synthetic generation can be understood as artificial production. Synthetically generated and/or artificially produced depth information values can therefore designate distance data that have not been acquired by a sensor and/or distance sensor, but rather have been produced for example manually and/or by machine.

In sum, according to the first aspect of the present invention, an example training method is provided for an ML system, such as a neural network, in which both image data, such as images of a camera, and also an at least partly synthetically generated depth map are supplied to the system. The parameter value of the at least one parameter of the ML system is adapted based on the image data and the depth map for the training of the ML system. In particular, in the training method according to the present invention a plurality of, or all, parameters of the ML system can be adapted so that for example an object recognition by the ML system is improved. Here, the ML system can be trained using image data, and exclusively with synthetically generated depth maps. Alternatively, in addition to image data and synthetically generated depth maps, real depth maps that have been acquired by a sensor can also be used for the training. Synthetically generated image data can also be supplied to the system for training.

Through the synthetic generation of the depth map, an artificial scenario can advantageously be produced and trained in which, for example, an interpretation of the image data and an interpretation of the depth map by the ML system would result in different reactions and/or results. In addition, compared to image data, a depth map can be synthetically produced with low outlay, quickly, and in a cost-efficient manner, because it is less complex compared to image data. In this way, depth maps can be produced in a cost-efficient fashion that may contradict the image data, may deviate from them, and/or may result in different reactions or interpretations by the ML system. In this way, the reaction of the ML system to unusual and rarely occurring scenarios, such as optical illusions, can advantageously be trained. For example, a scenario can be simulated in which a camera is used to make an image of an advertising poster on which a street is depicted. An interpretation of only this depiction of a street could have the result that the ML system interprets it as a real street. A sensor for acquiring distance information would however recognize the poster as a solid object at a fixed distance from the sensor, and would record corresponding depth information values and/or a depth map. Using the example method according to the present invention, such scenarios can advantageously be artificially produced and trained, so that the trained ML system can recognize and correctly interpret such scenarios during use. Overall, the ML system, in particular object recognition by the ML system, can be significantly improved by the method according to the present invention.

The present invention can be regarded in particular as being based on the findings described in the following. A learning system is generally improved by the processing of large amounts of training data. However, it is not possible to reproduce the entire world and/or all scenarios in the training data. Therefore, objects and/or scenarios may occur that are unknown to the system. The present invention therefore makes it possible to use additional synthetically produced depth maps to train a correct assessment of objects and/or scenarios that are not contained in a conventional training data set of real data. In a training of the ML system exclusively with real data, the parameters of the system, such as weights of a neural network, could be ascertained and/or selected in such a way that the system can derive complex information from the image data and can derive information from the depth maps that is less complex in comparison to the image data, because more information may be present in the image data compared to the depth maps. During use of the trained ML system, this can have the result that the system follows an interpretation of the image data, for example when image data and depth maps are interpreted that deviate from one another, because such deviations in real data sets are typically underrepresented, occur rarely, and may therefore be insufficiently trained. The use of a multipath system, which for example recognizes objects based on data from different sensors, such as image data and depth maps, can in general enable a redundant protection of the object recognition. Because it is relatively improbable that two different recognition paths of the system, for example a first path based on the image data and a second path based on the depth maps, will contain errors, each of the paths can be used as a plausibility check for the respective other path, and in this way the object recognition as a whole can be improved. Such scenarios, in which an interpretation of the image data by the ML system and an interpretation of the depth map by the ML system deviate from one another, can advantageously be trained by the method according to the present invention.

In other words, using the example method according to the present invention, a correct interpretation can be trained of objects having ambiguous appearance. Overall, therefore, the training process of learning systems can be expanded and improved. Scenarios with synthetically produced depth information are trained that occur only rarely and can therefore be trained into the system only with difficulty and at considerable expense. The core of the present invention is therefore the use of synthetically produced depth maps to train the system. The greatest benefit is seen in the handling of so-called corner cases, or rarely occurring special cases in which the image data would permit a different inference than the depth map, such as in the case of the optical illusions as described above. Such cases are very rare, and can be trained only with difficulty simply by feeding real scenes into the system. In general, therefore, the present invention can decisively improve a learning system and/or an ML system that has to reliably decide, on the basis of visual data and/or image data, whether it is dealing with a relevant object.

According to a specific embodiment of the present invention, the method additionally has the step of assigning the image data to the at least one depth map. Alternatively or in addition, the parameter value of the machine learning system is adapted as a function of the processed image data and as a function of the processed depth information values. In other words, the parameter value of the at least one parameter can be calibrated to both kinds of data, i.e., both the image data and the depth map. In this way, a multipath system can advantageously be comprehensively trained that analyzes and/or interprets a surrounding environment both based on image data, i.e., based on visual information, and also based on a depth map, i.e., based on spatial information.

According to a specific embodiment of the present invention, the depth map includes a matrix, an array, and/or a list having entries, each entry representing a pixel of a device for acquiring depth information, spatial information, and/or 3D information. A value of each entry is a depth information value for indicating a distance between the device and an object. The depth map can in particular designate a disparity map, and/or the depth information values can designate disparity values and/or distance data.

According to a specific embodiment of the present invention, the at least one depth map represents data of a stereo camera, a multiview camera, a distance measuring device, a radar-based distance measuring device, an ultrasound-based distance measuring device, and/or a laser-based distance measuring device. In general, the depth map can represent data of any sensor for acquiring distance information, distance data, and/or spatial information. In addition, the image data can designate data of any optical sensor, such as a camera, an RGB camera, a color camera, a grayscale camera, and/or an infrared camera.

According to a specific embodiment of the present invention, the step of synthetic generation of the at least one part of the at least one depth map includes in addition the substeps of defining, specifying, and/or determining a plurality of depth information values of the depth map and of storing the plurality of defined depth information values in the depth map. Here, in particular at least 1%, for example at least 5%, of all depth information values of the synthetically generated depth map can be defined. Through the specification of at least approximately 1% of the depth information values, it can be ensured that an adequately large and/or massive object can be artificially produced in the depth map, so that when a real depth map is fed into the trained ML system, for example statistical noise in the data is not recognized as an object. Overall, in this way the training process, and the object recognition, with the trained system can be further improved.

According to a specific embodiment of the present invention, the defined depth information values are values of at least one subset of entries of the depth map, which subset represents a contiguous pixel region of pixels of a device for acquiring depth information, so that by defining the depth information values, an item of distance information is produced regarding a geometrically contiguous object in the depth map. In this way, a massive and/or relatively large object can be artificially produced in the depth map that can represent a real object. The object artificially produced in the depth map can have any shape, contour, and/or size. The object can also be produced at any position in the depth map. In addition, a plurality of objects can be produced in a single depth map, for example at different positions.

According to a specific embodiment of the present invention, the geometrically contiguous object is contained exclusively in the at least one depth map, so that a discrepancy and/or a deviation between the image data and the at least one depth map is produced by the synthetic generation of the at least one part of the at least one depth map. In this context, the discrepancy between the depth map and the image data can mean that the object is present only in the depth map. Alternatively or in addition, the discrepancy can mean that different objects are present in the image data and in the depth map. For example, in the image data a roadway may be recognizable that however originates only from an advertising poster, whereas in the depth map the poster may be recognizable as a massive object at a certain distance.

According to a specific embodiment of the present invention, the parameter value of the at least one parameter of the machine learning system is adapted in such a way that, given a discrepancy between the image data and the at least one depth map, an interpretation of the depth map by the machine learning system is preferred over an interpretation of the image data by the machine learning system. In this way, it can be ensured that if the depth map, or the distance information contained therein, after interpretation by the ML system, permits the conjecture that, for example, an obstacle is situated in a travel path of a motor vehicle that however is not recognized, or is recognized insufficiently, by the ML system in the image data, the ML system provides a corresponding output that can cause the vehicle to execute a braking process and/or an evasive maneuver. In this way, the degree of reliability and/or precision of the object recognition by the trained ML system can be increased overall. When the ML system trained in this way is used in a vehicle, this can also significantly increase safety.

According to a specific embodiment of the present invention, the plurality of depth information values is defined and/or selected in such a way that a distance between the device for acquiring depth information and the object is in a range between 5 cm and 500 m, in particular between 5 cm and 200 m. In this way, the distance can correspond to a fictive distance of a fictive device for acquiring distance information from the object. For example, the distance from the object can be in a safety-relevant range of a vehicle, so that the ML system can be comprehensively trained for use in a vehicle. The corresponding distance of the synthetically generated object can be selected as a function of which type of device for acquiring distance information is represented by the depth map. If, for example, the depth map represents data of an ultrasound-based distance measuring device, then the object synthetically produced in the depth map can be produced at a smaller distance than would be the case for example given a radar-based distance measuring device, in order in this way to take into account the smaller range of the ultrasound-based distance measuring device.

According to a specific embodiment of the present invention, the method in addition has the following steps:
  synthetic generation of, in each case, at least a part of a plurality of depth maps, with definition of a plurality of depth information values of each depth map; and
  training of the machine learning system with processing of the plurality of synthetically generated depth maps by the machine learning system, the defined depth information values of each depth map respectively representing a contiguous pixel region of pixels of a device for acquiring depth information, so that through the definition of the depth information values of each depth map, in each case an item of distance information is produced relating to a geometrically contiguous object in the respective depth map.

In general, the training of the ML system can be improved by synthetic generation and training with processing of different depth maps. In this way as well, many different scenarios having many different objects can be trained, so that in this way the object recognition using the trained ML system can be substantially improved.

According to a specific embodiment of the present invention, the objects produced in the synthetically generated depth maps differ from one another with respect to a contour, a dimension, a position in the respective depth maps, and/or with respect to a distance. In other words, in the depth maps objects differing from one another can be produced, which can enable the training of different scenarios and/or a recognition of different objects. The objects produced in the depth maps can have for example a round, oval, cornered, polygonal, rectangular, triangular, or any other contour and/or geometry. The different objects can in particular be generated randomly. For example, specified parameters of the objects, such as dimensions, sizes, geometries, positions in the depth maps or the like, can be randomly varied, for example using a random number generator. Alternatively or in addition, the objects produced in the depth maps can originate from scanned real objects. In this way, large numbers of different depth maps having different objects can be produced efficiently and quickly and used for the training of the ML system.

According to a specific embodiment of the present invention, the machine learning system is an artificial neural network, in particular a multilayer artificial neural network. Alternatively or in addition, the at least one parameter of the machine learning system is a weight of a node of an artificial neural network. The neural network can be for example a linear, nonlinear, recurrent, and/or convolutional neural network.

A second aspect of the present invention relates to the use of at least one at least partly synthetically generated depth map in combination with image data for the training of a machine learning system, in particular for training an ML system as described above and in the following.

A third aspect of the present invention relates to a method for operating a machine learning system for a motor vehicle, the machine learning system being trained using a method as described above and in the following. The method for operating the ML system can designate, as it were, a method for recognizing objects using the ML system.

Features, elements, and/or steps of the method for training the ML system can be features, elements, and/or steps of the method for operating the trained ML system, and vice versa.

A fourth aspect of the present invention relates to a machine learning system for recognizing objects for a motor vehicle, the machine learning system being trained using a method as described above and in the following.

Features, elements, and/or steps of the method for training and/or of the method for operating the machine learning system can be features, elements, and/or properties of the machine learning system, and vice versa. In other words, everything disclosed in relation to an aspect of the present invention holds equally for all other aspects of the present invention.

BRIEF DESCRIPTION OF THE DRAWINGS

Below, exemplary embodiments of the present invention are described in detail with reference to the Figures.

The Figures are merely schematic and are not true to scale. In the Figures, elements that are identical, or have identical function, or are similar are provided with identical reference characters.

DETAILED DESCRIPTION OF EXAMPLE EMBODIMENTS

Figure 1:
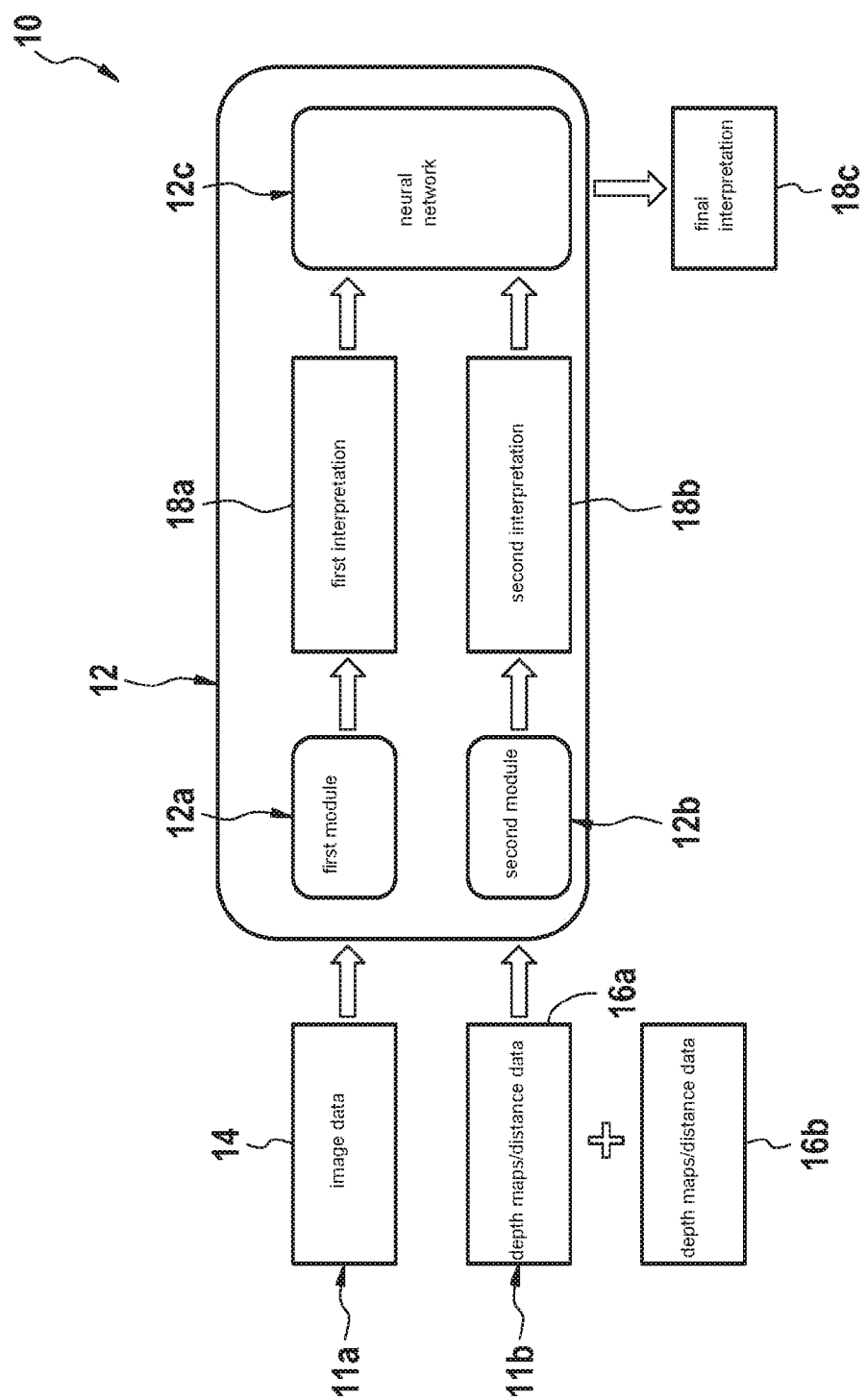
FIG. 1 shows a machine learning system according to an exemplary embodiment of the present invention.

FIG. 1 shows a machine learning system 10 according to an exemplary embodiment of the present invention. In general, ML system 10 can be an artificial intelligence system 10 of any type. In particular, ML system 10 can have at least one neural network 12. Here, neural network 12 can be realized in multilayer fashion, and can be a linear, nonlinear, recurrent, and/or convolutional neural network 12. Neural network 12 can have one or more convolution layers.

ML system 10 of FIG. 1 is realized as a multipath system 10; via a first path 11a, image data 14 can be fed into system 10 as input variables or input data, and can be processed by the system. Via a second path 11b, depth maps 16a, 16b, and/or distance data 16a, 16b can be fed into system 10 and processed by it.

System 10 shown in FIG. 1 has, as an example, three modules 12a, 12b, 12c. A first module 12a is configured to process, analyze, and/or interpret image data 14 and to ascertain and/or output a first interpretation 18a based on image data 14. Image data 14 can be for example images of a camera, an RGB camera, a color camera, a grayscale camera, and/or an infrared camera.

Second module 12b is configured to process, analyze, and/or interpret depth maps 16a, 16b, and to ascertain and/or output a second interpretation 18b based on depth maps 16a, 16b. Depth maps 16b here designate real depth maps 16b, which can be for example data of a stereo camera, a multiview camera, a distance measuring device, a radar-based distance measuring device, an ultrasound-based distance measuring device, and/or a laser-based distance measuring device. Depth maps 16b can also originate from an information source from which the depth information can be extracted, such as a mono camera unit having a structure-from-motion algorithm. Depth maps 16a, in contrast, designate synthetically generated depth maps 16a that are provided to system 10 for training purposes, as is described in detail below. Depth maps 16a can therefore be artificially produced and represent data of a stereo camera, a multiview camera, a distance measuring device, a radar-based distance measuring device, an ultrasound-based distance measuring device, and/or a laser-based distance measuring device.

As an example, in FIG. 1 the two interpretations 18a, 18b are supplied to a third module 12c that, based on the first and second interpretation 18a, 18b, ascertains and/or outputs a final interpretation 18c.

The three modules 12a, 12b, 12c can be modules 12a, 12b, 12c that are separate and/or independent of one another. Alternatively, modules 12a, 12b, or all three modules 12a, 12b, 12c, can be combined to form a single module. In particular, modules 12a-c can each be realized as neural networks 12a-c, and/or modules 12a-12c can be realized as a common neural network 12.

For the training of system 10, image data 14 are supplied to the system and via first path 11a, and/or are fed in to the system via a corresponding interface of system 10. Synthetically generated depth maps 16a are in addition supplied to system 10 via second path 11b, and/or are fed in to system 10 via a corresponding interface. In addition to the synthetically generated depth maps 16a, real depth maps 16b can also be supplied to system 10.

In the following, the training process of system 10 is explained in an example based on neural network 12. However, the training process can also proceed similarly for any other realization of system 10.

Neural networks 12a, 12b each process the data supplied to them, i.e., image data 14, synthetically generated depth maps 16a, and real depth maps 16b. Image data 14 and/or depth maps 16a, 16b can be labeled, i.e., can have an item of information concerning their content, such as objects contained in image data 14 and/or in depth maps 16a, 16b. In the case of forward propagation of image data 14, neural network 12a can ascertain and/or output the interpretation 18a, which can for example be a class of objects and/or probability values. With respect to interpretation 18a, in addition a recognition error can be determined on the basis of the labeling of the image data. Likewise, in the case of forward propagation of depth maps 16a, 16b, neural network 12b can ascertain and/or output interpretation 18b, which can be for example a class of objects and/or probability values. For interpretation 18b as well, a recognition error can be determined based on the label of depth maps 16a, 16b.

Neural networks 12a, 12b can then be operated in backwards propagation; here, parameter values of parameters of neural networks 12a, 12b, which can in particular designate weights of nodes of neural networks 12a, 12b, can be adapted, modified, and/or varied, in each case with minimization of the recognition errors.

Interpretations 18a, 18b can in addition be supplied to neural network 12c in order to ascertain and/or output a final interpretation 18c; here, again a recognition error can be determined. Neural network 12c can also be operated in backwards propagation and, with minimization of the recognition error, the parameter values of the parameters and/or the weights of the nodes of neural network 12c can be adapted, modified, and/or varied.

Alternatively, image data 14 and depth maps 16a, 16b can be forward-propagated together by system 10 and by the entire neural network 12 in order to obtain interpretation 18c. Neural network 12 can then also be operated in backwards propagation, and the weights of the nodes of overall system 10 and/or of the overall neural network 12 can be adapted, varied, and/or modified with minimization of the recognition error.

In every case, according to the present invention system 10 is supplied with image data 14 and with synthetically generated depth maps 16a, and the parameter values of the parameters of the system, in particular the weights of the nodes of neural network 12, are adapted for the training of system 10 and/or of neural network 12. The parameter values and/or weights adapted in this way then influence the interpretation and/or reaction of system 10 to any input data, such as images of a camera in a vehicle and sensor data of an ultrasound, radar, or laser distance sensor.

Below, various aspects and advantages of the present invention are summarized. The trained machine learning system 10 is supplied with image data 14, for example from a camera, and with depth maps 16b having depth information values that can represent items of depth information, distance information, spatial information, and/or movement information. Depth maps 16b can originate for example from a stereo camera. Based on the data from both information sources, i.e. image data 14 and depth maps 16b, the overall system 10 analyzes the surrounding environment. In purely image-based methods of object recognition, confusion and/or false interpretation 18a may occur. If, for example, persons are visible on an advertising poster, the image-based part, and/or first path 11a, of system 10 may fail to distinguish between a real person and a person on the poster. In addition, if objects not included in the training are present, system 10 may fail to decide what is there. It may therefore happen that an unknown gray box in image data 14 is recognized as a gray ground surface, as a bench, or as a door. In order to provide support in such cases of decision, it can be advantageous to make use of depth maps 16b in second path 11b of system 10.

For the training of system 10, it can be time-consuming to find ambiguous cases and scenarios in which depth maps 16b could provide clarity in finding a decision. For this reason, according to the present invention it is provided to use synthetically produced depth maps 16a for the training of system 10, thus substantially expanding the training of system 10 and in particular of module 12b. Synthetically produced depth maps 16b can exist in the same data file format as the real depth maps 16a, for example in the form of disparity maps. Depth maps 16a, 16b can for example include a matrix and/or a list having entries in which each entry represents a pixel of a device for acquiring depth information, and in which a value of each entry is a depth information value for indicating a distance between the device and an object. For the actual training, real depth maps 16b can be enriched and/or modified by various artificially produced objects at various positions. Alternatively, depth maps 16a can be for the most part, and/or completely, synthetically produced. For example, a plurality of depth information values, in particular at least 1% of the depth information values, of depth maps 16b can be defined and/or specified and stored in order to produce a synthetically generated depth map 16a. Here, in particular a contiguous pixel region in synthetically generated depth maps 16a can be manipulated and/or defined, so that in the synthetically generated depth maps, geometrically contiguous objects are produced that can represent real objects in real depth maps 16b. The manipulated and/or defined depth information values can in addition be selected such that they correspond to a distance to the respective object of between 5 cm and 500 m, in particular between 5 cm and 200 m. In this way, the objects can be produced at distances that are relevant to safety, for example for a vehicle. As an example, in a depth map 16a a block can be produced in the middle of a street that is delimited from the roadway by various depth information values, and that, in depth map 16a, represents an object on the roadway that is not visible in the visual image and/or image data 14. In this way, a situation is produced that imitates an optical illusion. In comparison to the production of realistic synthetic image data, it can be significantly more advantageous to produce synthetic, realistic depth maps 16a. In this way, in cases in which the image-based decision or interpretation 18a along first path 11a is not unambiguous, system 10 learns to focus on the depth information, second interpretation 18b, and/or second path 11b in order to make final interpretation 18c. Here it is uncritical that depth map 16b may also contain errors. Such error cases relate to individual small local image regions. Synthetic depth objects that have a smooth surface over a larger area are here clearly distinguishable from the errors which may occur in depth map 16b.

The second path 11b of module 12b can be expanded or replaced by a further module that is based on movement information. In the context of the present invention, the synthetic production of movement information, for example in the form of an optical flow, can result in an improved training scope. This is clearly shown by an example in which an object that is unknown or ambiguous moves through the field of vision of system 10.

In addition, it is to be noted that image data 14 can also be at least partly synthetically produced and used for the training of system 10.

Figure 2:
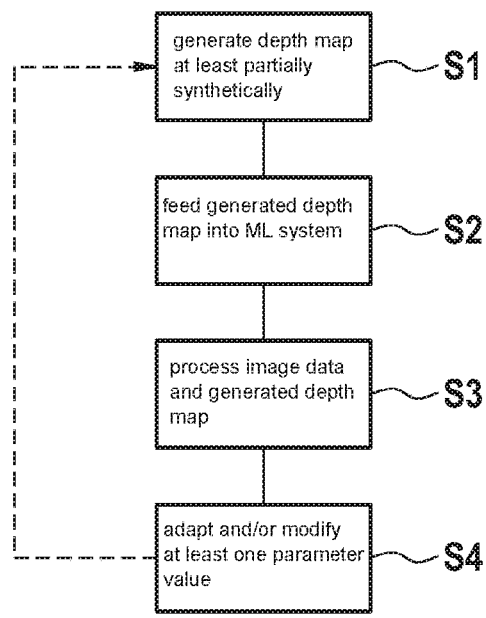
FIG. 2 shows a flow diagram illustrating steps of a method for training a machine learning system according to an exemplary embodiment of the present invention.

FIG. 2 shows a flow diagram for the illustration of steps of a method for training a machine learning system 10 according to an exemplary embodiment of the present invention. Unless otherwise indicated, the system 10 described in relation to FIG. 2 has the same elements and features as system 10 of FIG. 1.

In a first step S1, a depth map 16a is at least partly synthetically generated. For this purpose, in step S1 a plurality of entries of depth map 16a are manipulated, specified, modified, and/or defined. In particular, a subset of entries of depth map 16a can be manipulated and/or defined that represents a subset of a contiguous pixel region of a device for acquiring depth information. In this way, an object having a specified dimension, size, shape, geometry, and/or contour can be produced at a specified position and at a specified distance in depth map 16a. In addition, depth map 16a can be stored in a data storage device.

In a second step S2, the synthetically generated depth map 16a is fed into ML system 10, for example via a suitable interface. In addition, in step S2 image data 14 are fed into system 10. Image data 16 can originate from a camera and/or for example be stored on a data storage device. Optionally, in step S2 the image data 14 are assigned to the synthetically generated depth map 16a.

In a further step S3, image data 14 and the synthetically generated depth map 16a are processed, interpreted, and/or evaluated by system 10. Optionally, in step S3 a first interpretation 18a based on image data 14, and a second interpretation 18b based on depth map 16a, can be ascertained, produced, and/or outputted by system 10. Interpretations 18a, 18b can each have a class of objects and/or probability values for objects and/or for object classes.

In a further step S4, at least one parameter value of at least one parameter of system 10 is adapted and/or modified, so that system 10 is trained based on processed image data 14 and processed depth map 16a. For this purpose, for example the interpretations 18a, 18b can be propagated through system 10 in the backwards direction, and the parameter value of the at least one parameter can be adapted with minimization of a recognition error. In particular, for the training of system 10 all parameter values of all parameters of the system can be adapted. For example, the parameter values can be weights of nodes of a neural network 12. The two interpretations 18a, 18b can also be processed to form a final interpretation 18c of system 10 that in turn can optionally be outputted. Alternatively or in addition, in step S4 the final interpretation 18c, as well as a corresponding recognition error of this interpretation 18c, can be used to train system 10 and/or to adapt the parameter values.

For the training of rare cases, such as optical illusions, the object produced in synthetic map 16a in step S1 may be contained only in depth map 16a, and not in image data 14. Different objects can also be present in image data 14 and in depth map 16a, so that there is a discrepancy between image data 14 and depth map 16a. This can in turn have the result that interpretations 18a, 18b deviate from one another. Given a deviation of interpretations 18a, 18b from one another, in addition the parameter values of the parameters of system 10 can be adapted in step S4 in such a way that interpretation 18b, based on depth map 16a, is preferred over interpretation 18a, based on image data 14. The final interpretation 18c can preferably, as it were, agree with interpretation 18b, and the parameter values of system 10 can be correspondingly selected.

Steps S1 through S4 can be run through multiple times for the comprehensive training of system 10, and in steps S1 different depth maps 16a, with objects that are different relative to one another, can always be produced and fed into system 10. The objects in depth maps 16a can here differ from one another with respect to a dimension, size, shape, geometry, position, distance, and/or any other variables. In this way, system 10 can be trained on all possible objects and scenarios.

Figure 3:
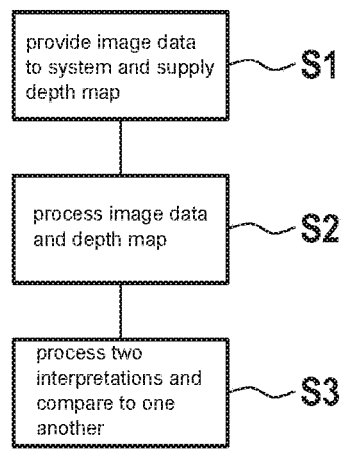
FIG. 3 shows a flow diagram illustrating steps of a method for operating a machine learning system according to an exemplary embodiment of the present invention.

FIG. 3 shows a flow diagram illustrating steps of a method for operating a machine learning system 10 according to an exemplary embodiment of the present invention. Unless otherwise stated, system 10 described with reference to FIG. 3 has the same elements and features as system 10 of FIG. 1. In addition, system 10 of FIG. 3 can be trained using the method described with reference to FIG. 2. System 10 can here be configured in particular for object recognition in a motor vehicle.

In a first step S1, image data 14, for example from a camera of the motor vehicle, can be provided to the system. In addition, in step S1 a depth map 16b having distance information, for example from a stereo camera, an ultrasound sensor, or some other distance sensor, is supplied to system 10.

In a step S2, image data 14 and depth map 16b are processed, interpreted, and/or analyzed by system 10. Here, based on image data 14 system 10 can determine a first interpretation 18a of a scenario represented in the image data 14. In addition, system 10 can determine a second interpretation 18b based on depth map 16b.

The two interpretations 18a, 18b are then further processed and optionally compared with one another, in a step S3. Based on the interpretations 18a, 18b, in step S3 a final interpretation 18c of the scenario represented in image data 14 and depth map 16b is determined and/or created. If the two interpretations 18a, 18b do not agree with one another, then for safety reasons interpretation 18b, based on depth map 16b, can be preferred over interpretation 18a based on image data 14.

In addition, the final interpretation 18c can be supplied to further components of the motor vehicle, such as a control device. Based on interpretation 18c, a reaction of the vehicle, such as a braking process and/or an evasive maneuver, can then be determined, initiated, and/or executed.

In addition, it is to be noted that "including" does not exclude any other elements, and "a" or "one" does not exclude a plurality. In addition, it is to be noted that features that have been described with reference to one of the above exemplary embodiments can also be used in combination with other features of other exemplary embodiments described above.

What is claimed is:

1. A method for training a machine learning system, the method comprising the following steps:
feeding image data into a machine learning system and processing at least a part of the image data by the machine learning system;
synthetically generating at least a part of at least one depth map that has a plurality of depth information values, each of the depth information values correlating with a distance to an object;
feeding the at least one depth map into the machine learning system and processing of at least a part of the depth information values of the at least one depth map by the machine learning system; and training the machine learning system based on the processed image data and based on the processed depth information values of the at least one depth map, with adaptation of a parameter value of at least one parameter of the machine learning system, wherein the adapted parameter value influences an interpretation of input data by the machine learning system.

2. The method as recited in claim 1, further comprising the following step:
(i) assigning the image data to the at least one depth map; and/or
(ii) adapting the parameter value of the machine learning system as a function of the processed image data and as a function of the processed depth information values.

3. The method as recited in claim 1, wherein the depth map includes a matrix and/or a list having entries, each of the entries of the matrix and/or list representing a pixel of a device for acquiring depth information, and a value of each of the entries being a depth information value for indicating a distance between the device and an object.

4. The method as recited in claim 1, wherein the at least one depth map represents data of: a stereo camera, and/or a multiview camera, and/or a distance measuring device, and/or a radar-based distance measuring device, and/or an ultrasound-based distance measuring device, and/or a laser-based distance measuring device.

5. The method as recited in claim 1, the synthetic generation of the at least one part of the at least one depth map includes defining a plurality of depth information values of the depth map, and storing the plurality of defined depth information values in the depth map.

6. The method as recited in claim 5, wherein the defined depth information values representing values of at least one subset of entries of the depth map, the subset representing a contiguous pixel region of pixels of a device for acquiring depth information, so that through the definition of the depth information values an item of distance information is produced relating to a geometrically contiguous object in the depth map.

7. The method as recited in claim 6, wherein the geometrically contiguous object is contained exclusively in the at least one depth map, so that through the synthetic generation of the at least one part of the at least one depth map, a discrepancy is produced between the image data and the at least one depth map.

8. The method as recited in claim 5, wherein the plurality of depth information values is defined and/or selected such that a distance between the device and the object is in a range between 5 cm and 500 m.

9. The method as recited in claim 8, wherein the range is between 5 cm and 200 m.

10. The method as recited in claim 1, wherein the parameter value of the at least one parameter of the machine learning system is adapted such that, given a discrepancy between the image data and the at least one depth map, an interpretation of the depth map by the machine learning system is preferred over an interpretation of the image data.

11. The method as recited in claim 1, further comprising the following steps:
synthetically generating, in each case, at least a part of a plurality of depth maps, and defining a plurality of depth information values of each of the depth map; and
training machine learning system including processing of the plurality of synthetically generated depth maps by the machine learning system, the defined depth information values of each of the depth maps representing in each case a contiguous pixel region of pixels of a device for acquiring depth information, so that through the definition of the depth information values of each depth map, in each case, an item of distance information is produced relating to a geometrically contiguous object in the respective depth map.

12. The method as recited in claim 11, wherein the objects produced in the synthetically generated depth maps differ from one another with respect to a contour, and/or a dimension, and/or a position, and/or a distance.

13. The method as recited in claim 1, wherein: (i) the machine learning system is a multilayer artificial neural network, and/or (ii) the at least one parameter of the machine learning system is a weight of a node of an artificial neural network.

14. A method for operating a machine learning system for a motor vehicle, the method comprising the following steps:
providing a trained machine learning system, the machine learning system being trained by:
feeding image data into the machine learning system and processing at least a part of the image data by the machine learning system;
synthetically generating at least a part of at least one depth map that has a plurality of depth information values, each of the depth information values correlating with a distance to an object;
feeding the at least one depth map into the machine learning system and processing of at least a part of the depth information values of the at least one depth map by the machine learning system; and
training the machine learning system based on the processed image data and based on the processed depth information values of the at least one depth map, with adaptation of a parameter value of at least one parameter of the machine learning system, wherein the adapted parameter value influences an interpretation of input data by the machine learning system;
using the trained machine learning system for object recognition in the motor vehicle; and
controlling the motor vehicle based on the object recognition by the trained machine learning system.

15. A machine learning system for recognizing objects for a motor vehicle, the machine learning system being trained by:
feeding image data into the machine learning system and processing at least a part of the image data by the machine learning system;
synthetically generating at least a part of at least one depth map that has a plurality of depth information values, each of the depth information values correlating with a distance to an object;
feeding the at least one depth map into the machine learning system and processing of at least a part of the depth information values of the at least one depth map by the machine learning system; and
training the machine learning system based on the processed image data and based on the processed depth information values of the at least one depth map, with adaptation of a parameter value of at least one parameter of the machine learning system, wherein the adapted parameter value influences an interpretation of input data by the machine learning system.

* * * * *